(12) United States Patent
Mohamadi

(10) Patent No.: US 7,042,388 B2
(45) Date of Patent: May 9, 2006

(54) BEACON-ON-DEMAND RADAR TRANSPONDER

(76) Inventor: Farrokh Mohamadi, 8 Halley, Irvine, CA (US) 92612-3797

( * ) Notice: Subject to any disclaimer, the term of this patent is extended or adjusted under 35 U.S.C. 154(b) by 0 days.

(21) Appl. No.: 10/891,352

(22) Filed: Jul. 14, 2004

(65) Prior Publication Data

US 2005/0012654 A1    Jan. 20, 2005

Related U.S. Application Data

(60) Provisional application No. 60/487,418, filed on Jul. 15, 2003.

(51) Int. Cl.
*G01S 13/08* (2006.01)
*G01S 13/74* (2006.01)
*G01S 13/78* (2006.01)

(52) U.S. Cl. .............................. 342/51; 342/30; 342/45

(58) Field of Classification Search .................. 342/30, 342/42, 44, 45, 51
See application file for complete search history.

(56) References Cited

U.S. PATENT DOCUMENTS

| | | | |
|---|---|---|---|
| 4,047,171 A * | 9/1977 | Fugit | 342/51 |
| 4,218,680 A * | 8/1980 | Kennedy | 342/51 |
| 4,298,873 A | 11/1981 | Roberts | |
| 4,451,831 A | 5/1984 | Stangel | |
| 4,510,497 A * | 4/1985 | Onozawa | 342/51 |
| 4,586,047 A | 4/1986 | Inacker | |
| 4,613,869 A | 9/1986 | Ajioka | |
| 4,654,666 A | 3/1987 | Wiley | |
| 4,724,440 A | 2/1988 | Lopez | |
| 4,885,592 A | 12/1989 | Kofol | |
| 5,027,127 A | 6/1991 | Shnitkin | |
| 5,093,667 A | 3/1992 | Andricos | |
| 5,103,233 A | 4/1992 | Gallagher | |
| 5,107,273 A | 4/1992 | Roberts | |
| 5,115,243 A | 5/1992 | Perry | |
| 5,115,244 A | 5/1992 | Freedman | |
| 5,128,683 A | 7/1992 | Freedman | |
| 5,129,099 A | 7/1992 | Roberts | |
| 5,173,706 A | 12/1992 | Urkowitz | |
| 5,175,556 A | 12/1992 | Berkowitz | |
| 5,187,486 A | 2/1993 | Koelzer | |
| 5,339,083 A | 8/1994 | Inami | |
| 5,353,031 A | 10/1994 | Rathi | |
| 5,412,414 A | 5/1995 | Ast | |
| 5,861,843 A | 1/1999 | Sorace | |
| 6,100,843 A | 8/2000 | Proctor | |
| 6,104,935 A | 8/2000 | Smith | |
| 6,285,313 B1 | 9/2001 | Wahab | |
| 6,304,214 B1 | 10/2001 | Aiken | |
| 6,384,782 B1 | 5/2002 | Erikmats | |

(Continued)

OTHER PUBLICATIONS

Grzyb, "MM-Wave Microstrip and Novel Slot Antennas on Low Cost Large Area Panel MCM-D Substrates", 2001 IEEE.

(Continued)

*Primary Examiner*—Ian J. Lobo
(74) *Attorney, Agent, or Firm*—Jonathan W. Hallman; MacPherson Kwok Chen & Heid

(57) ABSTRACT

A radar transponder is provided that synchronizes the encoding of repeated radar pulses using an envelope detector to detect the envelope of received radar pulse signals. An edge detector detects the pulse edges in the envelope so that code words may be multiplied with the received radar pulse signals synchronously with the detected pulse edges to provide an encoded pulse train that may be transmitted to a radar interrogator.

14 Claims, 9 Drawing Sheets

U.S. PATENT DOCUMENTS

| | | |
|---|---|---|
| 6,404,386 B1 | 6/2002 | Proctor |
| 6,411,256 B1 | 6/2002 | Lier |
| 6,518,920 B1 | 2/2003 | Proctor |
| 6,535,180 B1 | 3/2003 | Gregorwich |
| 6,567,040 B1 | 5/2003 | Sevaston |
| 2005/0206551 A1* | 9/2005 | Komiak et al. ............... 342/42 |

OTHER PUBLICATIONS

Sidiropoulos, "A Semidigital Dual Delay-Locked Loop", 1997 IEEE.

Muldavin, "MM-Wave Tapered Slot Antennas on Synthesized Low Permitivity Substrates", 1999, IEEE, vol. 47, No. 8, pp. 1276-1280.

Lubecke, "Micromachining for Terahertz Applications", Photodynamics Research Center, pp. 1-16.

Raman, "A High Performance W-Band Uniplanar Subharmonic Mixer", 1997 IEEE, vol. 45, No. 6, Jun. 1997, pp. 955-962.

Lie, "Phase Noise Analysis of Fully-Integrated Digitally-Tuned Wideband Si/SiGe BiCMOS", 2002 IEEE BCTM, pp. 65-68.

Lee, "A 5Gb/s 0.25 . . . CMOS Jitter-Tolerant Variable-Interval Oversampling Clock/Data Recovery Circuit", ISSCC 2002/ Session 15/ IEEE.

Larsson, "A 2-1600-MHz CMOS Clock Recovery PLL with Low-Vdd Capability", 1999 IEEE, vol. 34, No. 12, Dec. 1999, pp. 1951-1960.

Gauthier, "A 94-GHz Aperture-Coupled Micromachined Microstrip Antenna", 1999 IEE, vol. 47, No. 12, Dec. 1999, pp. 1761-1766.

Gauthier, "Microstrip Antennas on Synthesized Low Dielectric-Constant Substrates", 1997 IEEE, vol. 45, No. 8, Aug. 1997, pp. 1310-1314.

Garlepp, "A Portable Digital DLL for High-Speed CMOS Interface Circuits", 1999 IEEE, vol. 34, No. 5, May 1999, pp. 632-644.

Bienfang, "Quantum Generated One-Time-Pad Encryption With 1.25 Gbps Clock Synchronization", National Institute of Standards and Technology.

Andrews, "Phase-Locked-Loop Control of Active Microstrip Patch Antennas", 2002 IEEE, vol. 50, No. 1, Jan. 2002, pp. 201-206.

NESIC, "Antenna Solution for Future Communication Devices in mm-Wave Range", 2001 IEEE, pp. 194-202.

Farserotu, "A Survey of Future Broadband Multimedia Satellite Systems, Issues and Trends", 2000 IEEE Communication Magazine, pp. 128-133.

Zheng, "A Universal Sensor Signal Conditioning ASIC", 1999 IEEE, pp. 120-126.

Rebeiz, "Millimeter-Wave and Terahertz Integrated Circuit Antennas", 1992 IEEE, vol. 80, No. 11, Nov. 1992, pp. 1748-1770.

* cited by examiner

BEACON-ON-DEMAND RADAR TRANSPONDER

RELATED APPLICATIONS

This application claims the benefit of U.S. Provisional Application No. 60/487,418, filed Jul. 15, 2003.

TECHNICAL FIELD

The present invention relates generally to radar transponders, and more particularly to a beacon-on-demand transponder having coding programmability, wideband operation, and efficient power use.

BACKGROUND

In a beacon mode of operation, radars interrogate transponders. The transponders may provide a coded response that is interpreted by the interrogating radar. Thus, in addition to the standard range and directional information that radars receive, a radar in a beacon mode may receive other types of information such as the identification friend or foe (IFF) or surveillance data by decoding the coded response. One class of radar transponders do not repeat received radar pulses and instead simply provide a coded response upon detection of radar interrogation. However, it may be desired that the transponder repeat the interrogating radar pulses. Should there be no coding of the repeated pulses, such a transponder could be designed using a low noise amplifier to amplify the received pulses so that they may be re-transmitted. A transponder configured to simply repeat received radar pulses in this fashion acts a type of "electrical mirror" to the interrogating radar.

The repetition of received radar pulses becomes more complicated if a code is to be imposed upon the repeated pulses. To impose a code, the pulse envelope on the received pulses must be stripped from the carrier frequency. The transponder may then modulate the pulse envelope with the desired code. The modulated pulse envelope is then multiplied with the carrier frequency, amplified, and re-transmitted back to the interrogating radar. But note the problem that arises in a wideband design. Because of the wideband operation, the transponder has no way of knowing the particular carrier frequency an interrogating radar may be using. Thus, the transponder would need some means such as a phase-locked loop to lock onto the carrier frequency before the envelope detection stage. Because of this retention of the carrier signal, the transponder may then multiply it back onto the code-modulated pulse envelope. However, the inclusion of a phase-locked loop increases power demands and manufacturing costs. Furthermore, wideband width application of the transponder demands use of a more elaborate frequency synthesizer system.

Accordingly, there is a need in the art for improved radar transponder architectures for the repetition of coded radar pulses.

SUMMARY

In accordance with one aspect of the invention, a radar transponder is provided that includes: an amplifier operable to amplify a received radar pulse train to provide an amplified received radar pulse train; an envelope detector operable to detect the envelope of the amplified received radar pulse train; an edge detector operable to detect pulse edges in the envelope; a code generator operable in a first mode of operation for the transponder to provide code words synchronously to the detection of the pulse edges by the edge detector; and a a multiplier configured to multiply the synchronously provided code words with the amplified received radar pulse train to provide an encoded pulse train signal.

In accordance with another aspect of the invention, a method is provided including the acts of: receiving a train of radar pulses; envelope detecting the received train of radar pulses to provide an envelope pulse signal; edge detecting the envelope pulse signal; generating code words substantially synchronously to the edges detected in the envelope pulse signal; and multiplying the generated code words with the received train of radar pulses to provide an encoded pulse train.

In accordance with another aspect of the invention, an integrated antenna is provided that includes: a substrate having a first surface and an opposing second surface; heavily-doped contact regions extending from the first surface to the second surface; a metallic layer on the second surface; an insulating layer on the metallic layer; antenna elements formed on the insulating layer; and electrical conductors formed in vias in the insulating layer, the electrical conductors coupling the antenna elements through the contact regions to driving circuitry formed on the first surface of the substrate.

The invention will be more fully understood upon consideration of the following detailed description, taken together with the accompanying drawings.

DETAILED DESCRIPTION

The present invention provides a radar transponder having a programmable coding capability. Although this radar transponder will repeat and code received radar pulses over a broad range of carrier frequencies such as, for example, 8 to 20 GHz, its method of synchronizing the code imposed on the envelope of the repeated radar pulse does not require a phase-locked loop to recover the carrier frequency to multiply with the encoded envelope. Instead, the present invention provides a radar transponder architecture that amplifies received radar pulse signals and then multiplies the amplified received radar pulse signals with the desired code. To align the desired code words with the start of each amplified received radar signal, the beginning pulse edges for the envelope of the amplified received radar pulse signals are detected and used to synchronize the code words.

Figure 1:
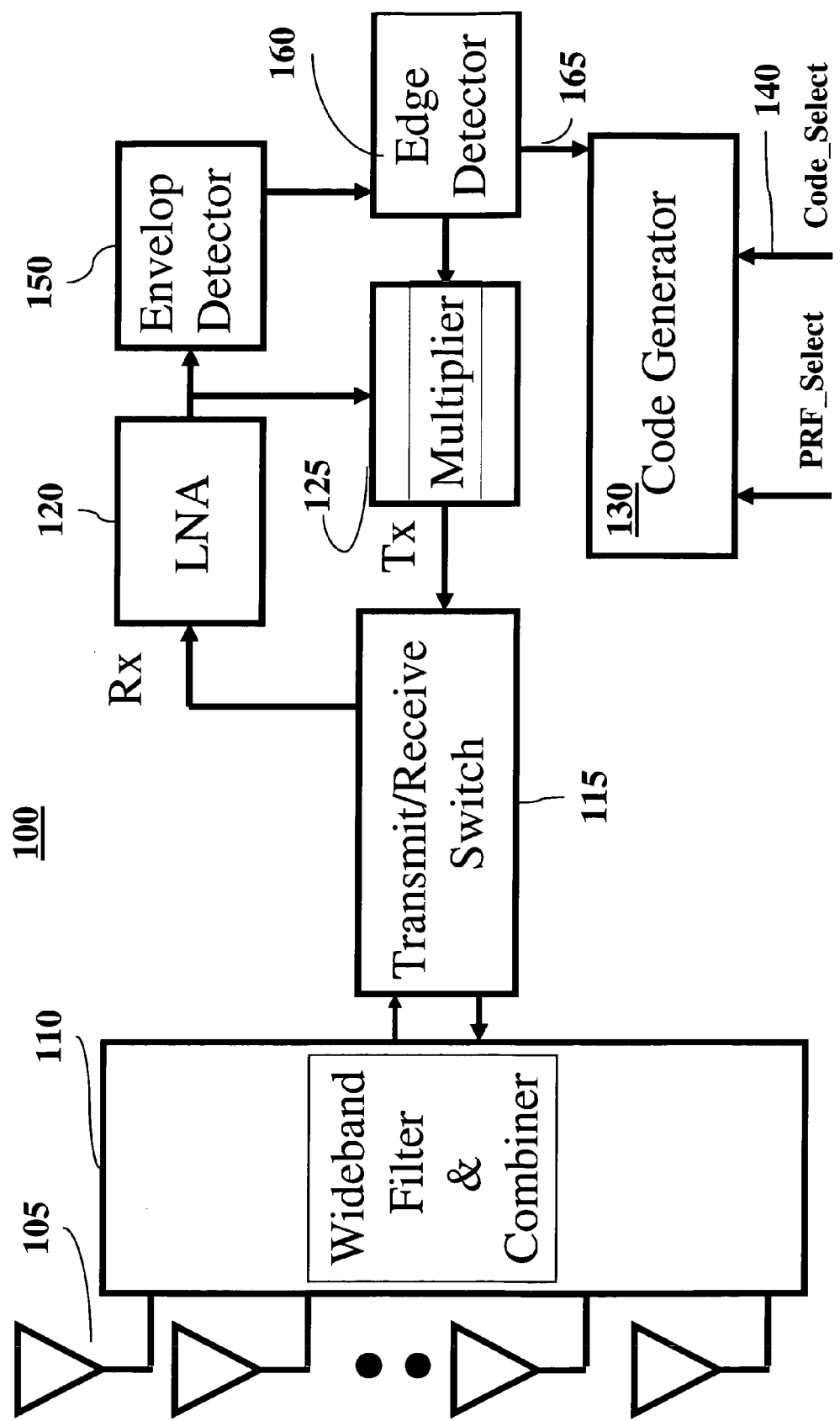
FIG. 1 is a block diagram of a transponder in accordance with an embodiment of the invention.

Referring now to the drawings, a block diagram of an exemplary radar transponder 100 is shown in FIG. 1. Transponder 100 includes an array of antennas 105 to receive radar pulses from an interrogating radar although it will be appreciated that embodiments of the present invention may be constructed using a single antenna. Received signals from antennas 105 are filtered and combined in a wideband filter and combiner 110 before coupling through a receive/transmit switch 115 to a low noise amplifier 120. Low noise amplifier 120 couples the amplified received pulse signals to a multiplier 125, where they are multiplied by code words provided by a programmable code generator 130. Should code generator 130 provide a default "code" of all binary ones, it may be seen that the multiplied signal provided by multiplier 125 is simply the amplified received signals pulses produced by low noise amplifier 120. Thus, in such a relay mode of operation, transponder 100 simply relays or repeats the received radar pulses without any coding. It will be appreciated, however, that no code words need be generated in such a relay mode such that the output of the low noise amplifier bypasses the multiplier and is coupled to the antennas.

Figure 2:
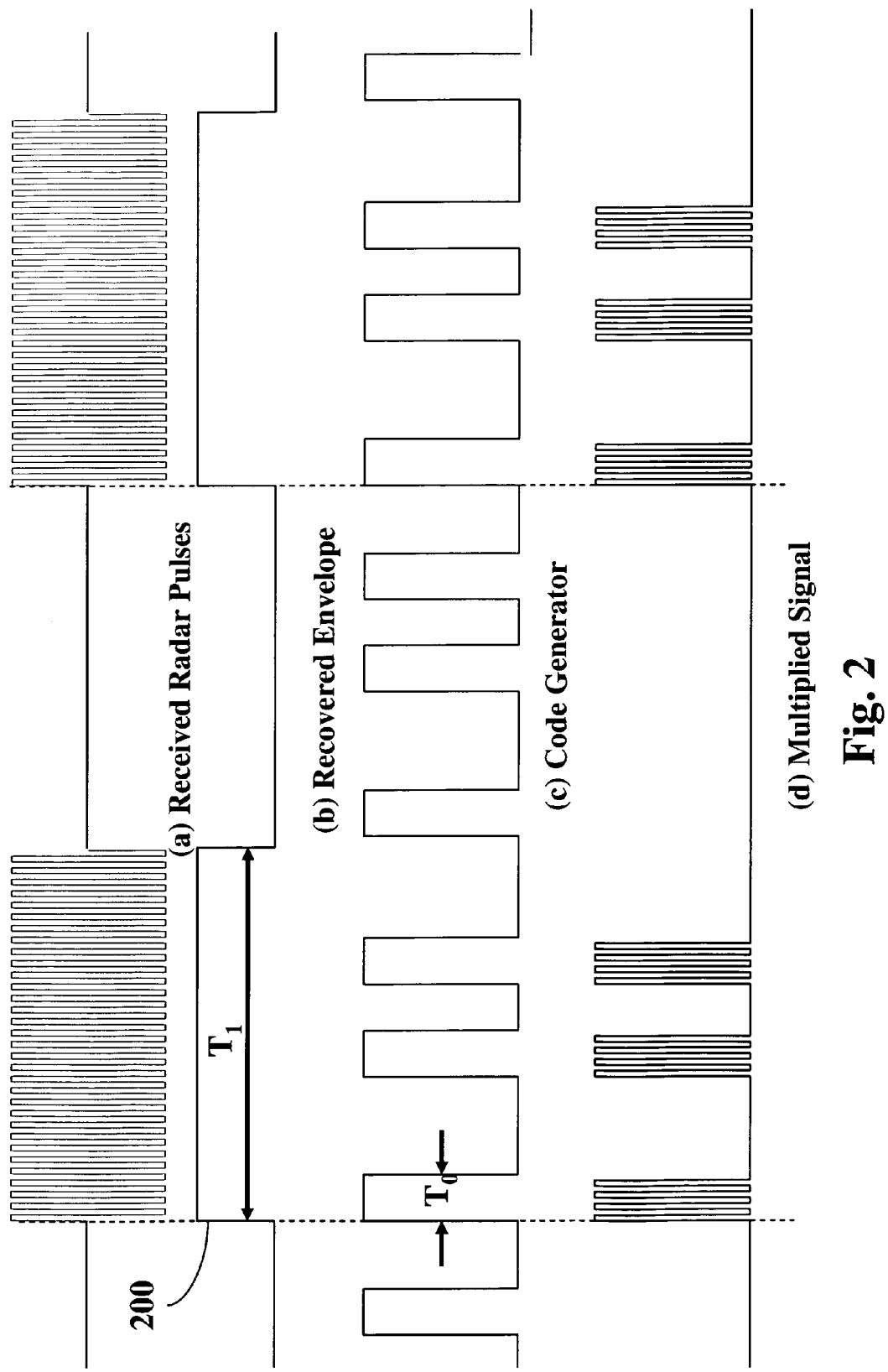
FIG. 2 illustrates exemplary waveforms for a received radar pulse train, a recovered envelope, a synchronized code word train, and a multiplication of the synchronized code word train and the received radar pulse train for the transponder of FIG. 1.

A user of transponder 100 may, however, desire to impose a coding on the repeated radar pulses. For example, transponder 100 may be used to provide a locator beacon to identify personnel during a search and rescue mission. In such a situation, a user may desire to indicate that they are injured, lost, or provide other distinguishing information. Through the actuation of code selection knobs (not illustrated), a user may drive the state of a code selection signal 140. Depending upon the state of code selection signal 140, code generator 130 then generates the appropriate code words. As discussed previously, these generated code words must be synchronized with the pulse edges before they multiply the amplified received signal pulses from low noise amplifier 120. To provide this synchronization, transponder 100 includes an envelope detector 150 so that the pulse envelope for the amplified received signal pulses may be retrieved. For example, consider the waveform for a train of amplified received radar signal pulses is shown in FIG. 2 as well as the recovered pulse envelope. Referring back to FIG. 1, transponder includes an edge detector 160 that operates on the recovered envelope signal from envelope detector 150. For each envelope pulse edge such as pulse edge 200 shown in FIG. 2, edge detector provides a timing signal 165 to code generator 130. In response to timing signal 165, code generator generates the appropriate code word as determined by code select signal 140. In general, the bit period (denoted as $T_0$ in FIG. 2) for the bits in the generated code word is just a fraction of the pulse period so that the code word does not extend beyond the length of any given radar pulse. In the exemplary codeword shown in FIG. 2, the code word is 101101. The transmission period $T_0$ for the first bit is synchronized to start with the pulse edge of the recovered envelope. If the first bit for the code word is always a logical 1, it will be appreciated, however, that a certain amount of delay may be tolerated so long as the code word may be completed before the pulse duration ends (denoted as $T_1$ in FIG. 2). Accordingly, in such an embodiment, the precision for envelope detector 150 and edge detector 160 is not that stringent, thereby reducing manufacturing costs for transponder 100. Conversely, should it be desired that the first bit for the generated code words be arbitrary, envelope detector 150, edge detector 160, and code generator 130 should have sufficient precision such that the first bit is less than $T_0/2$ of the pulse edge.

Also shown in FIG. 2 is the multiplied signal from multiplier 125. This signal then couples through switch 115 and wideband combiner 110 before being transmitted by antennas 105. As seen in FIG. 2, edge detector 160 may respond to both rising and falling edges for the recovered envelope signal because code words generated in response to a falling edge have no pulse to be multiplied by. It will be appreciated, however, that an edge detector 160 that detects only rising edges could also be used, depending upon implementation and cost considerations.

Advantageously, the carrier frequency is thus provided by low noise amplifier 120 in a repeater fashion. Accordingly, a wideband operation is enabled in that the carrier signal need not be recovered through, for example, the use of a frequency synthesizer or multiple phase-locked loops. In that regard, considerable manufacturing savings are provided by transponder 100.

Additional manufacturing savings and power efficiencies are provided through the integration of transponder 100 into a single integrated circuit. Each antenna 105 may be formed as T-shaped dipoles or patch antennas using conventional CMOS processes as discussed in U.S. Ser. No. 10/423,160 (the '160 application), the contents of which are hereby incorporated by reference in their entirety. For example, as seen in cross section in FIG. 3, antenna 105 may be configured as a T-shaped dipole antenna 300. T-shaped antenna 300 is excited using vias 310 that extend through insulating layers 305 and through a ground plane 320 to driving transistors formed on an active layer 330 separated from a substrate 350 by insulating layer 305. Active layer 330 would thus constitute the remaining components of transponder 100 described with respect to FIG. 1. Two T-shaped antenna elements 300 may be excited by switching layer 330 to form a dipole pair 360. To provide polarization diversity, two dipole pairs 360 may be arranged such that the transverse arms in a given dipole pair are orthogonally arranged with respect to the transverse arms in the remaining dipole pair.

Depending upon the desired operating frequencies, each T-shaped antenna element 300 may have multiple transverse arms. The length of each transverse arm is approximately one-fourth of the wavelength for the desired operating frequency. For example, a 2.5 GHz signal has a quarter wavelength of approximately 30 mm, a 10 GHz signal has a quarter wavelength of approximately 6.75 mm, and a 40 GHz signal has a free-space quarter wavelength of 1.675 mm. Thus, a T-shaped antenna element 300 configured for operation at these frequencies would have three transverse arms having fractions of lengths of approximately 30 mm, 6.75 mm and 1.675 mm, respectively. The longitudinal arm of each T-shaped element may be varied in length from 0.01 to 0.99 of the operating frequency wavelength depending upon the desired performance of the resulting antenna. For example, for an operating frequency of 105 GHz, a longitudinal arm may be 500 micrometers in length and a transverse arm may be 900 micrometers in length using a standard semiconductor process. In addition, the length of each longitudinal arm within a dipole pair may be varied with respect to each other. The width of a longitudinal arm may be tapered across its length to lower the input impedance. For example, it may range from 10 micrometers in width at the via end to hundreds of micrometers at the opposite end. The resulting input impedance reduction may range from 800 ohms to less than 50 ohms.

Each metal layer forming T-shaped antenna element 300 may be copper, aluminum, gold, or other suitable metal. To suppress surface waves and block the radiation vertically, insulating layer 305 between the T-shaped antenna elements 300 within a dipole pair may have a relatively low dielectric constant such as ∈=3.9 for silicon dioxide. The dielectric constant of the insulating material forming the remainder of the layers holding the lower T-shaped antenna element 300 may be relatively high such as ∈=7.1 for silicon nitride, ∈=11.5 for Ta2O3, or ∈=11.7 for silicon. Similarly, the dielectric constant for the insulating layer 305 above ground plane 320 should also be very low (such as ∈=3.9 for silicon dioxide, ∈=2.2 for Teflon, or 1.0 for air should the insulating layer comprise a honeycombed structure).

Figure 4:
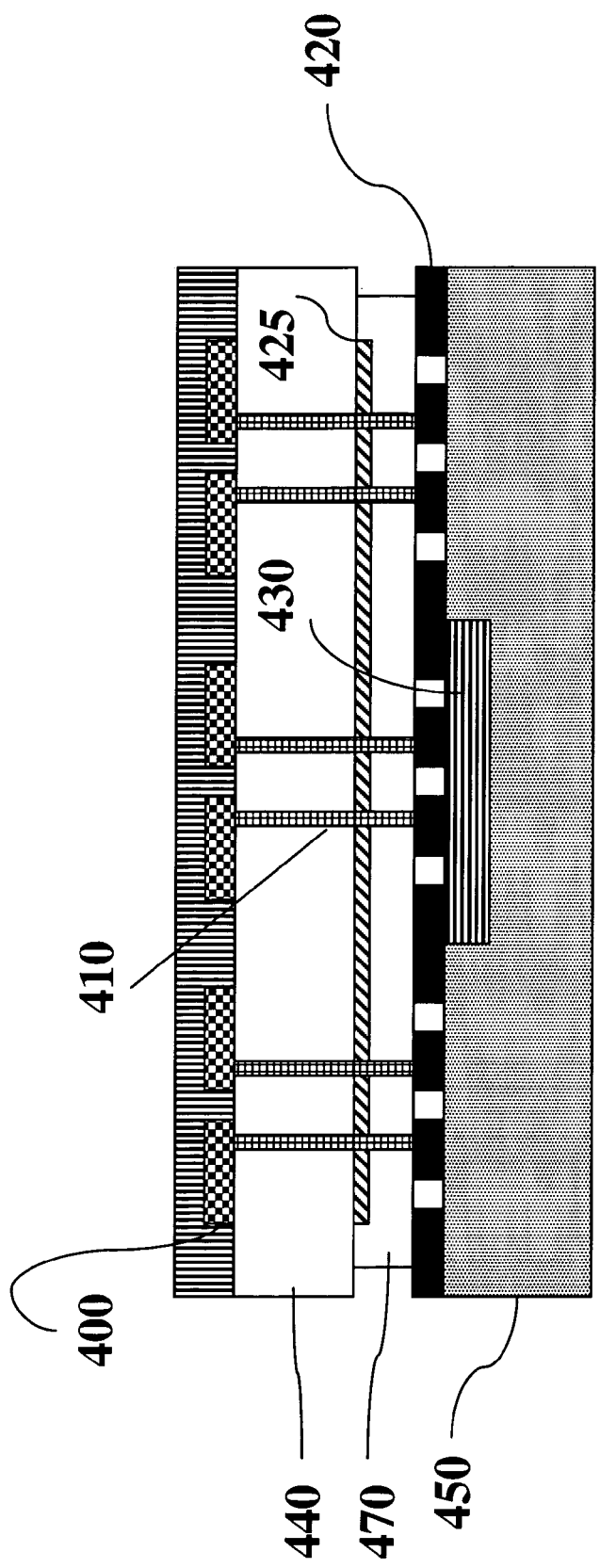
FIG. 4 is a cross-sectional view of an antenna element having a relatively thick dielectric layer to reduce coupling between the antenna and the substrate.

The quarter wavelength discussion with respect to the T-shaped dipole antenna 300 may be generally applied to other antenna topologies such as patch antennas. However, note that it is only at relatively high frequencies such as the upper bands within the W band of frequencies that the quarter wavelength of a carrier signal in free space is comparable or less than the thickness of substrate 350. Accordingly, at lower frequencies, integrated antennas should be elevated away from the substrate by using an interim passivation layer. Such an embodiment for an T-shaped antenna element 400 is shown in FIG. 4. Silicon substrate 450 includes RF driving circuitry 430 that drives a T-shaped dipole antenna 400 through vias 410 analogously as discussed with respect to antenna 300. However, a grounded shield 420 is separated from the T-shaped dipole antenna elements 400 by a relatively thick dielectric layer 440. For example, dielectric layer 440 may be 1 to 2 mm in thickness. In this fashion, lower frequency performance is enhanced. In addition, dielectric layers 440 and inter-layer dielectric layer 470 may be constructed from flexible materials for a conformal application.

Figure 3:
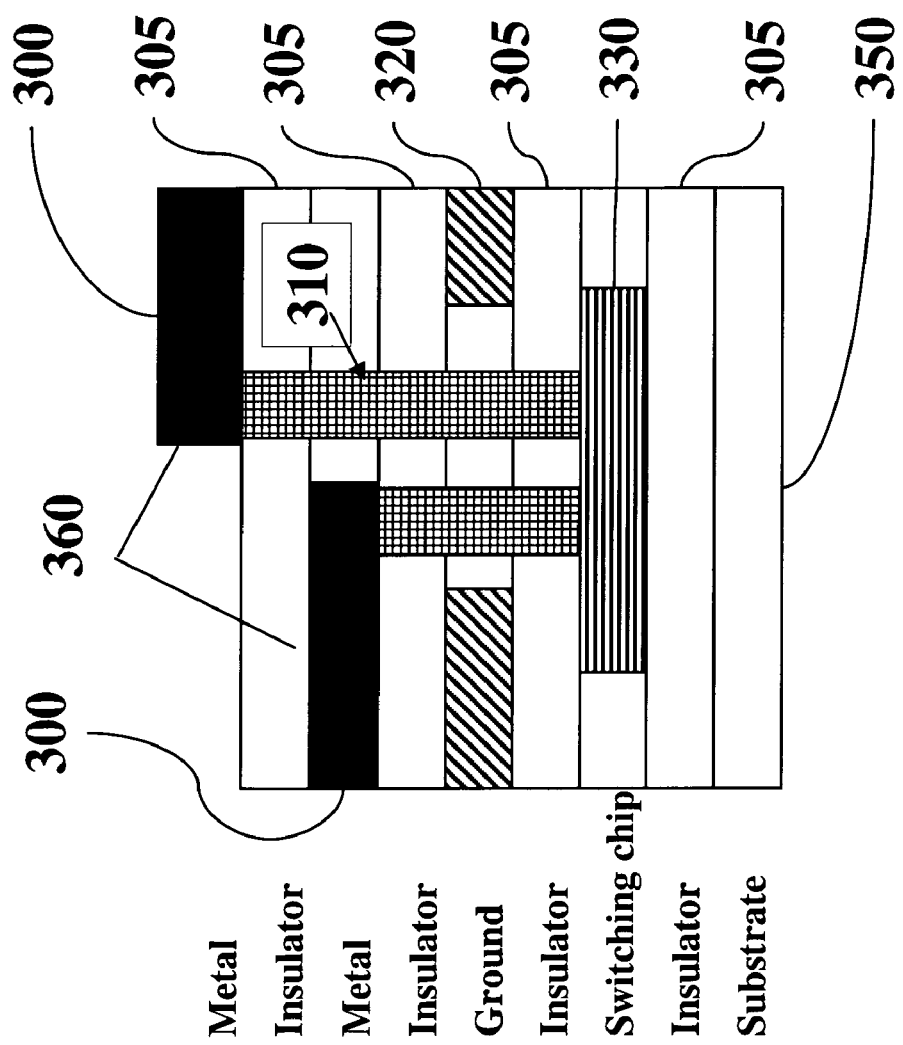
FIG. 3 is a cross-sectional view of a T-shaped dipole antenna which may be used within the transponder of FIG. 1.
Figure 5:
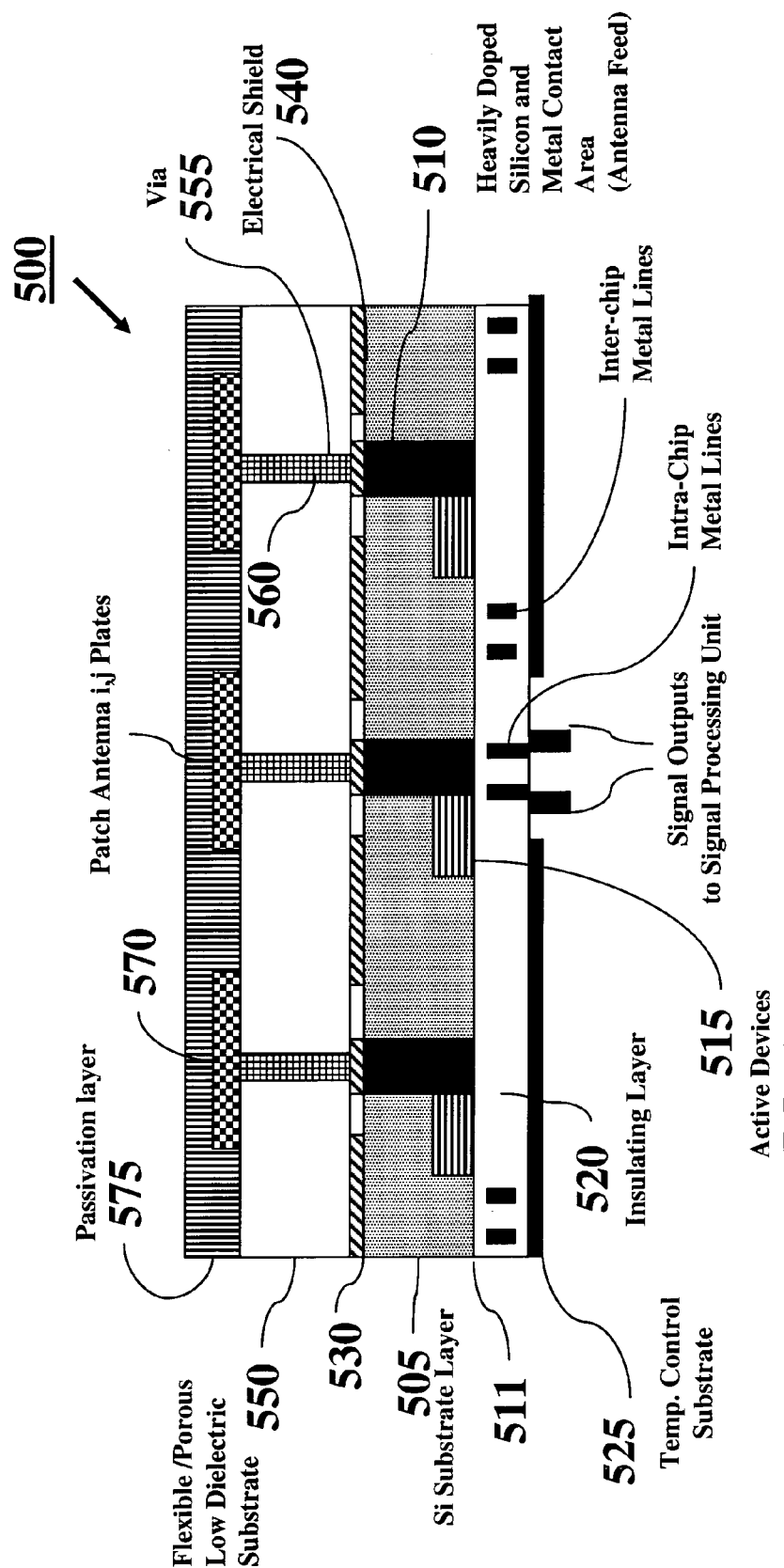
FIG. 5 is a cross-sectional view of an antenna element configured for greater connectivity properties in accordance with an aspect of the invention.

Although the antenna designs shown in FIGS. 3 and 4 advantageously may be integrated with the remaining components of transponder 100, these remaining components are formed on substrate surface that faces the antennas. As the number of antennas within the array is increased, the coupling of signals to the antenna's driving circuitry becomes cumbersome, particularly for a wafer-scale design. Accordingly, the present invention provides an antenna topology wherein the antennas are formed on a first side of the semiconductor substrate. The remaining components of transponder 100 may then be integrated onto the opposing second side of the semiconductor substrate. For example, consider the patch antennas 500 shown in FIG. 5. To allow the formation of active circuitry on one side of a substrate 505 and patch antennas 500 on the opposing side of substrate 505, heavily doped (which may be either n+ or p+depending upon design considerations) contact areas 510 are diffused through substrate 505 to serve as feed structures for patch antennas 500. Active circuitry 515 comprising the remainder of transponder 100 may then be formed on surface 511 of substrate 505. Active circuitry 515 may next be passivated through the deposition of a passivation layer 520 on surface 511. For example, layer 520 may comprise a low temperature porous SiOx layer and a thin layer of Nitride (SixOyNz) such that passivation layer 520 is a fraction to a few microns in thickness. Passivation layer 520 may then be coated with a thermally conductive material 525 and taped to a plastic adhesive holder so that substrate 505 may be flipped to expose as yet-unprocessed side 530 of substrate/wafer 505.

To ensure that contact areas 505 electrically couple through substrate 505, side 530 of substrate 505 may be back-ground such that substrate 505 has a thickness of a few hundred micrometers. An optional metallization layer 540 may then be sputtered or alternatively coated using conductive paints onto surface 530. Layer 540 acts as an electric shield or a reflective plane between antennas 500 and active circuitry 515. To assist electrical coupling, metal layer 540 may be patterned to form metal lumps on top of contacts 510. A layer 550 of porous low dielectric material or honeycomb structure may then be deposited or placed onto metal layer 540, respectively. Layer 550 may also be formed of flexible material for conformal designs. Target alignment patterns that were etched during conventional manufacturing of the substrate 505 may then be used to guide the location of vias 555, which may be bored using micromachining techniques through layer 550. Alternatively, a conventional infra-red alignment scheme of prior art may be used to locate vias 555. Precision rods 560 are then inserted through vias 555 to allow electrical coupling to patch antennas 500. Alternatively, a conductive material may be deposited into vias 555. Advantageously, the formation of metal bumps as described previously in metal layer 540 ease the formation of ohmic contacts between contacts 510 and rods 560. Without these bumps, inserting rods into metal layer 540 would involve an increased risk of cracking substrate 505. Antennas plates 570 may then be formed and protected by a passivation layer 575, which also provides impedance matching to the outside environment. It will be appreciated that other types of antennas such as the T-shaped dipoles described previously may also be formed using the technique discussed with respect to FIG. 5. Moreover, the contacts 505 may be formed from the back side 530 of substrate 505 such that active circuitry could cover overlay the heavily-doped contact areas. In such an embodiment, the contact areas need not extend all the way through the substrate but just reach to the level where the active circuitry is formed. Regardless of how the contact areas are formed, it will be appreciated that electrical isolation between the active circuitry and the antenna elements is enhanced by such a design. Moreover, such a design allows the application of thermally conductive material 525 on the same side of the substrate where the active circuitry is formed. Should the active circuitry be formed on the same side of the substrate in common with the antenna elements as seen in FIGS. 3 and 4, a thermally conductive material would have to be placed on the opposite side of the substrate, thereby reducing its effectiveness.

Figure 6:
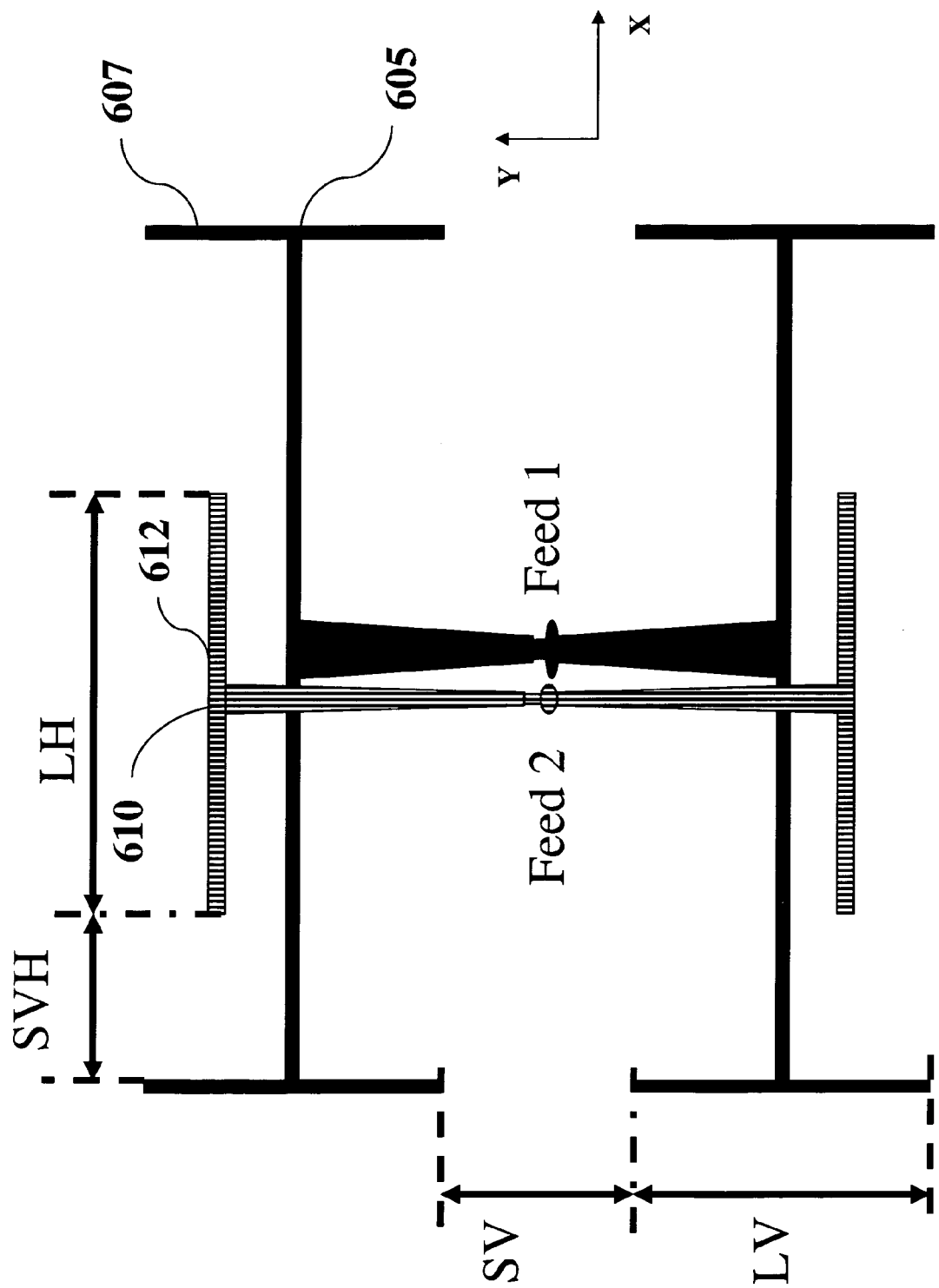
FIG. 6 is a plan view of an antenna array configured for a relay mode of operation in accordance with an aspect of the invention.
Figure 7:
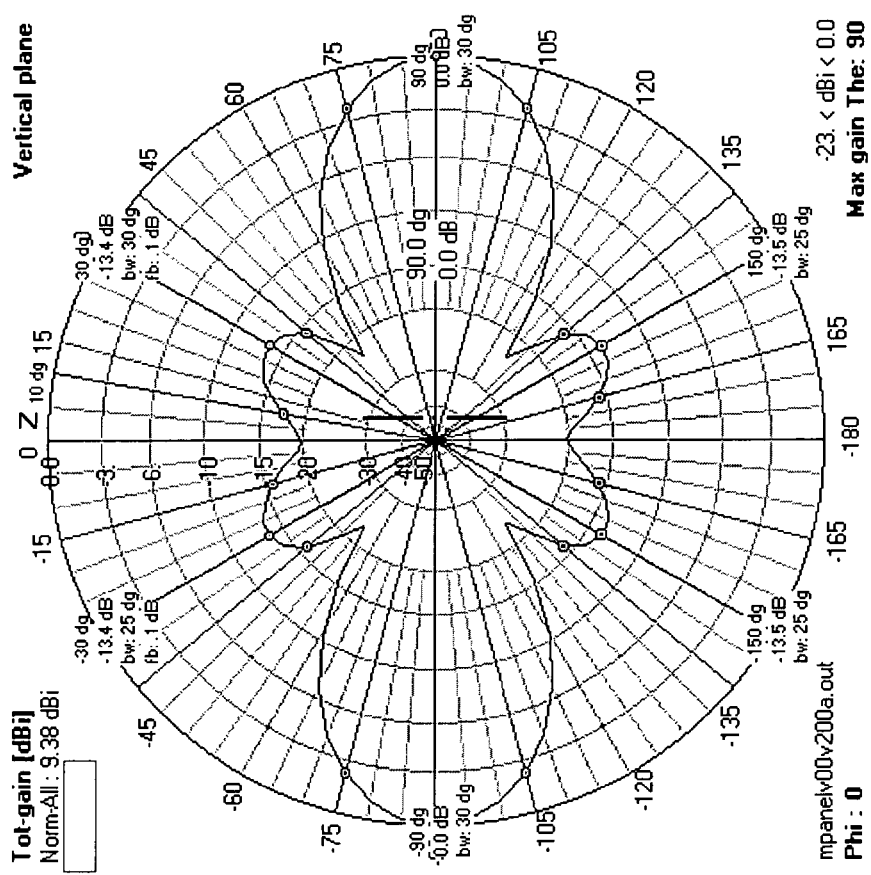
FIG. 7 is a 3-dimensional plot of the radiation field strength for the antenna array of FIG. 6 in a first mode of operation.
Figure 8:
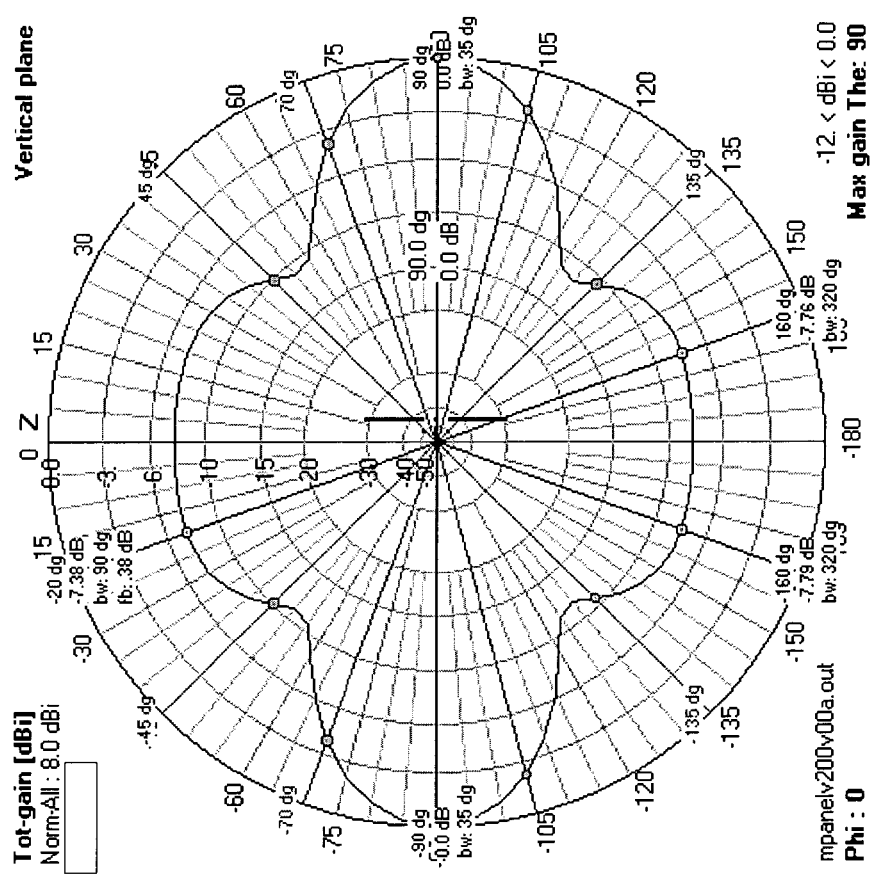
FIG. 8 is a 3-dimensional plot of the radiation field strength for the antenna array of FIG. 6 in a second mode of operation.

Antenna design may be influenced by the purpose to which transponder 100 is dedicated. For example, suppose transponder 100 is to be used in a relay chain with other transponders arranged in an x-y plane. It would be advantageous to have a first antenna mode wherein z-directed radiation from an interrogating radar would be favored versus a second antenna mode wherein radiation in the x-y plane is favored. In this fashion, a transponder may both communicate with the interrogating radar and also with the other transponders. Turning now to FIG. 6, an antenna array 600 is shown that supports both modes of operation. Array 600 includes a quad dipole antenna 605 configured so its transverse arms 607 are in an x-y plane defined by the substrate (not shown but discussed with respect to FIG. 5) and orthogonal to the x-direction. A double dipole 610 is configured so its transverse arms 612 also lie in the x-y plane but orthogonal to the y-direction configured to radiate in the z-direction. The dimensions LV, SV, SVH, and LH depend upon the desired frequency band of operation. For example, for operation in a 9 to 10 GHz frequency band, dipole length for quad dipole 605 is LV=15 mm with a vertical separation between dipole pairs of SV=7 mm. Double dipole 605 has horizontal separation from quad dipole 605 by SVH=9 mm and dipole length of LH=15 mm. These dimensions can vary depending on the strength filed desired in X-Y plane as well XY-Z direction. As an example, launching quad dipole 605 with a 1 volt signal at 50 ohms of matching impedance, delivers 45 mW of radiation power with 7 to 9 dBi of antenna gain depending on the various separations of SV and SVH. If double dipole 610 is also triggered with a 1 volt launch signal at 50 ohms of matching impedance, the vertical (Z-axis) of the field will provide about 7 dBi of antenna gain. The directionality control is used to address the relay function of the composite design such that signals can picked up from X-Y plane and delivered to the Z-Axis or vice-versa. The resulting radiation field strengths are shown in FIGS. 7 and 8. In FIG. 7, only the quad dipole is activated such that there is little z-directed radiation. However, in FIG. 8, both the quad dipole and the double dipole are activated. Considerably more radiation power is then present in the z-direction. Consider the advantages of the relay-enhancement provided an antenna design such as that discussed with respect to FIG. 6. Transponders could be designed as rocks, plants and arranged in an ad hoc fashion in a strategic location such as a potential battlefield. An interrogating radar could then illuminate a target but at a reduced power such that the return signal would be undetectable by the radar. However, the scattered signal from the target could then be relayed through the transponders back to the interrogating radar. Moreover, locational or other types of information could be coded onto the relayed signal by the transponders.

Figure 9:
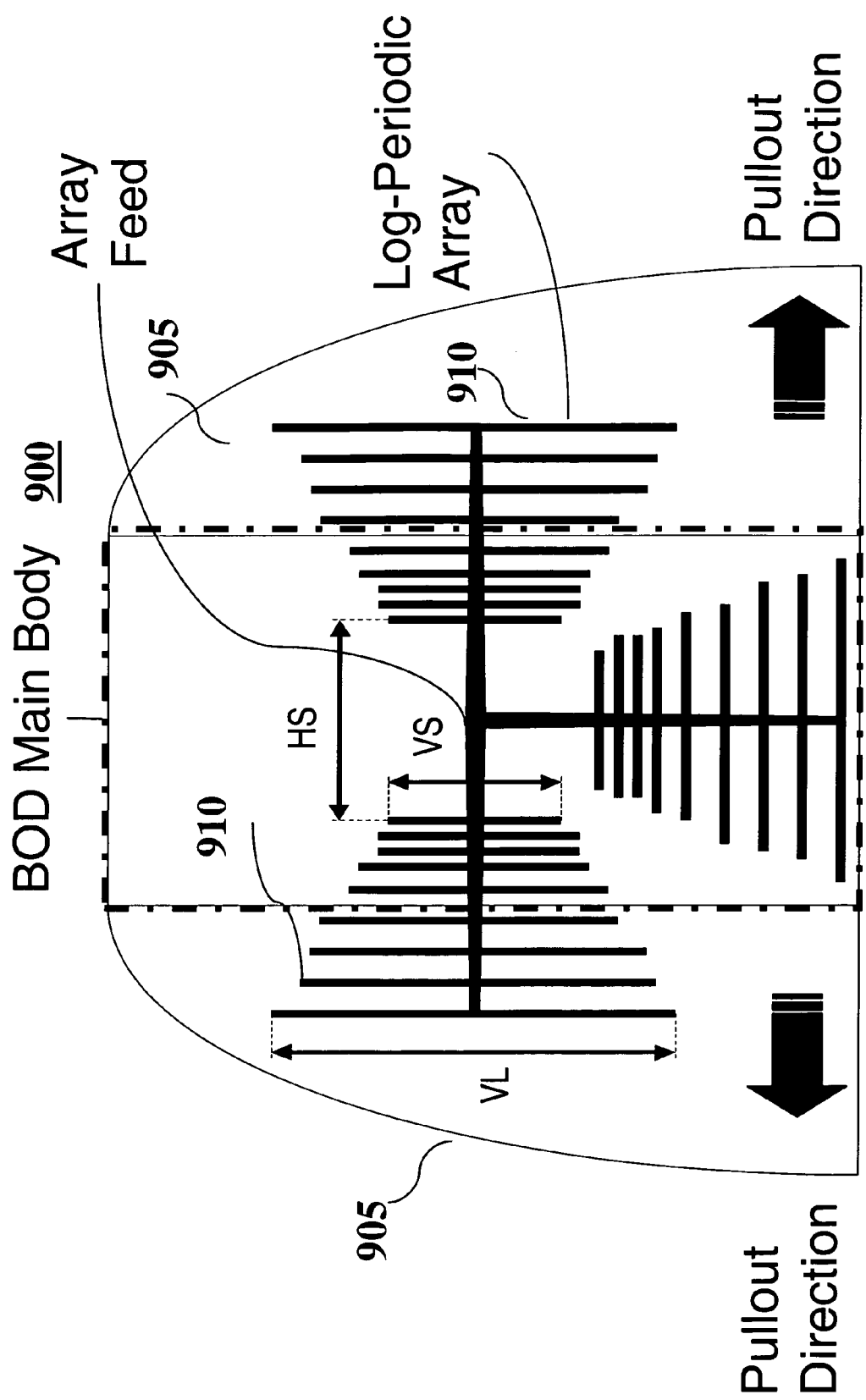
FIG. 9 is a plan view of a transponder package and an expandable antenna in accordance with an aspect of the invention.

It will be appreciated that although transponder 100 of FIG. 1 may be integrated onto a single substrate, it may also be constructed using discrete components. Alternatively, various components may be integrated onto a single substrate. Regardless of the level of integration, transponder 100 may be packaged such that it has a relatively small footprint, for example, 152 mm by 54 mm by 20 mm. Transponder 100 may be integrated with a global positioning system (GPS) unit such that its location may be coded onto repeated pulses. Moreover, greater antenna gain may be achieved by printing the antenna elements onto a flexible substrate that may be expanded beyond the package footprint. For example, as seen in FIG. 9, a transponder main body 900 may include flexible substrates 905 that may be extended or pulled from transponder 900. In the embodiment shown, flexible substrates 905 include a portion of log-periodic antennas 910. As an example, the longest vertical length of the array (VL) can be around 15 mm for operation in the 10 GHz band whereas its shortest vertical length is around 5 mm (VS) for 30 GHz operation. The separation of the log periodic antennas 910 (HS) can be from 20 mm to 60 mm depending on the design of the beacon.

It will thus be obvious to those skilled in the art that various changes and modifications may be made without departing from this invention in its broader aspects. The appended claims encompass all such changes and modifications as fall within the true spirit and scope of this invention.

I claim:

1. A radar transponder, comprising:
   an amplifier operable to amplify a received radar pulse train to provide an amplified received radar pulse train;
   an envelope detector operable to detect the envelope of the amplified received radar pulse train;
   an edge detector operable to detect pulse edges in the envelope;
   a code generator operable in a first made of operation for the transponder to provide code words synchronously to the detection of the pulse edges by the edge detector; and a
   a multiplier configured to multiply the synchronously provided code words with the amplified received radar pulse train to provide an encoded pulse train signal.

2. The radar transponder of claim 1, further comprising:
   at least one antenna operable to transmit the encoded pulse train.

3. The radar transponder of claim 2, wherein the at least one antenna comprises an antenna array.

4. The radar transponder of claim 2, wherein the transponder is configured to include a second mode of operation, the at least one antenna being further operable to transmit the amplified received radar pulse train in the second mode of operation.

5. The radar transponder of claim 1, wherein the edge detector is configured to detect both rising and falling pulse edges.

6. The radar transponder of claim 1, wherein the edge detector is configured to detect only rising pulse edges.

7. The radar transponder of claim 1, thither including a GPS unit, the code words provided by the code generator encoding locational information from the GPS unit.

8. The radar transponder of claim 1, wherein the code generator is configured to provide its code words responsive to a selection signal, the selection signal being driven according to inputs from a user.

9. A method of encoding, comprising:
   receiving a train of radar pulses;
   envelope detecting the received train of radar pulses to provide an envelope pulse signal;
   edge detecting the envelope pulse signal;
   generating code words substantially synchronously to the edges detected in the envelope pulse signal; and
   multiplying the generated code words with the received train of radar pulses to provide an encoded pulse train.

10. The method of claim 9, further comprising:
    transmitting the encoded pulse train.

11. The method of claim 9, wherein the receiving act comprises receiving and amplifying to provide the received radar pulse train.

12. The method of claim 9, wherein the edge detecting act comprises detecting both rising and falling edges.

13. The method of claim 9, wherein the edge detecting act comprises detecting only rising edges.

14. The method of claim 9, further comprising:
    providing coordinates from a GPS unit; wherein the code words are encoded responsive to the coordinates.

* * * * *

UNITED STATES PATENT AND TRADEMARK OFFICE
CERTIFICATE OF CORRECTION

| | | |
|---|---|---|
| PATENT NO. | : 7,042,388 B2 | Page 1 of 1 |
| APPLICATION NO. | : 10/891352 | |
| DATED | : May 9, 2006 | |
| INVENTOR(S) | : Farrokh Mohamadi | |

It is certified that error appears in the above-identified patent and that said Letters Patent is hereby corrected as shown below:

Please replace "505" with --510-- on line 5 of column 6
Please replace "505" with --510-- on line 37 of column 6
Please replace "thither" on line 1 of claim 7 with --further--.

Signed and Sealed this

Sixth Day of November, 2007

JON W. DUDAS
*Director of the United States Patent and Trademark Office*